United States Patent [19]

Harvey

[11] Patent Number: 5,021,815
[45] Date of Patent: Jun. 4, 1991

[54] VIEWFINDER FOR TELE/PAN CAMERA

[75] Inventor: Donald M. Harvey, Webster, N.Y.

[73] Assignee: Eastman Kodak Company, Rochester, N.Y.

[21] Appl. No.: 486,442

[22] Filed: Feb. 28, 1990

[51] Int. Cl.[5] .......................................... G03B 13/10
[52] U.S. Cl. .................................................. 354/222
[58] Field of Search ............................. 354/222–225, 354/195.1, 195.12

[56] References Cited

U.S. PATENT DOCUMENTS

| | | | |
|---|---|---|---|
| 2,187,246 | 1/1940 | Nerwin | 354/222 |
| 3,253,628 | 5/1966 | Bing | 354/222 |
| 3,836,934 | 9/1974 | Suzuki et al. | 354/222 |
| 4,104,663 | 8/1978 | Yamazaki et al. | 354/195.12 |
| 4,119,983 | 10/1978 | Tanaka | 354/222 |
| 4,195,924 | 4/1980 | Stemme et al. | 354/222 |
| 4,277,158 | 7/1981 | Zawodny | 354/195.12 |
| 4,583,831 | 4/1986 | Harvey | 354/106 |
| 4,652,104 | 3/1987 | Harvey | 354/106 |
| 4,653,887 | 3/1987 | Wakamiya | 354/219 |
| 4,697,901 | 10/1987 | Wakabayashi et al. | 354/221 |
| 4,715,692 | 12/1987 | Yamada et al. | 330/422 |
| 4,928,124 | 5/1990 | Taniguchi et al. | 354/195.1 |

*Primary Examiner*—L. T. Hix
*Assistant Examiner*—David M. Gray
*Attorney, Agent, or Firm*—Roger A. Fields

[57] ABSTRACT

A viewfinder for a tele/pan camera includes a slidable U-shaped bracket having three spaced eyepiece lenses with associated reticles and two spaced auxiliary lenses. The bracket is shiftable relative to the optical axis of a fixed panoramic lens and spherical mirror, to provide changes in viewfinder magnification and fields of view corresponding to "pan," "normal" and "tele" settings.

9 Claims, 2 Drawing Sheets

VIEWFINDER FOR TELE/PAN CAMERA

The present invention relates generally to a viewfinder for a tele/pan camera, and, more particularly, to a viewfinder for presenting a more accurate representation of the resulting pseudo format prints, viewed from a constant distance.

BACKGROUND OF THE INvENTION

A tele/pan camera is a camera that enables telephoto and panoramic prints to be produced from film frame exposures made without the corresponding telephoto and panoramic lenses by coding the film at the time of exposure to identify variations from normal processing to be taken subsequently during printing in order to simulate the same desired effect.

A pseudo telephoto print is one that is made from a central portion of an exposure having the same width-to-length ratio (e.g., 3 1/2:5) as that of the whole exposure recorded by the camera at the time the picture is taken. During the printing process, the frame negative image is masked at upper, lower, left and right marginal zones, leaving the central portion unobscured to be printed with increased magnification for obtaining an enlargement of normal print size. The enlargement has the same width-to-length ratio as that of the non-masked central portion. Thus, in response to coding the film at the time the exposure is made, the central portion of the exposure is magnified at the time of printing beyond the normal magnification for the camera lens employed to take the picture, and the resulting print will have a telephoto or close-up format appearance.

A pseudo panoramic print is one that is made from a narrow portion of an exposure having a greater width-to-length ratio (e.g., 1:3) than that of the original exposure recorded by the camera. During the printing process, the negative frame image is masked at upper and-/or lower marginal zones, leaving the narrow portion unobscured. An enlargement is then made of the narrow, non-masked portion to provide a print having the same width-to-length ratio as that of the narrow portion. Thus, in response to coding the film at the time the exposure is made, the field of view is adjusted at the time of printing, to provide a print which has a panoramic or elongate format appearance.

U.S. Pat. No. 3,490,844 discloses a method of making a print of a selected portion of a subject to be photographed. The method comprises the steps of: viewing the subject in the viewfinder of a camera; manually adjusting mechanical masking member visible in the viewfinder to frame a selected portion of the subject; exposing the film in the camera to obtain a latent image of the subject; encoding the exposure on the film with indicia representative of the selected portion of the subject; processing the film to obtain a negative of the latent image of the subject; and sensing the indicia to make a print of the selected portion of the subject from the negative.

When the selected portion of the subject has the same relative position in the viewfinder as a corresponding portion of the exposure, enlargement of the portion in the negative will provide a pseudo telephoto effect similar to the actual telephoto effect provided by a telephoto lens. Thus, a pseudo telephoto print can be made during the printing process from an exposure taken without a telephoto lens.

U.S. Pat. No. 4,357,102 discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2, and preferably 1:3. Exposures are taken with the viewfinder window partially masked and, during the printing of the negative, the negative image is correspondingly masked to provide a non-masked portion having the same width-to-length ratio as that of the unobscured portion of the viewfinder window. Printing paper with a similar width-to-length ratio is used. Prints can thus be obtained which have a panoramic or elongate format without using a panoramic lens.

U.S. Pat. No. 4,583,831 describes a tele/pan camera having a fixed focus lens viewfinder which employs a liquid crystal display (LCD) masking unit in the viewfinder. The masking unit operates to provide various masking configurations in the finder field, corresponding to the pseudo panoramic and pseudo telephoto settings of the camera for a fixed objective lens setting. The non-masked portion of the viewfinder shows the portion of the full exposure which is identified for subsequent enlarging for a selected pseudo panoramic or pseudo telephoto setting.

U.S. Pat. No. 4,652,104 discloses an improved viewfinder for use with a tele/pan camera employing a viewfinder zoom lens. The viewfinder lens is adjustable to change its angular field of view in correspondence with the picture-taking zoom lens, within the range of the picture-taking lens. The viewfinder is further adjustable to change its field of view to a plurality of telephoto fields narrower than the possible fields of the picture-taking lens. This permits the user to see the pseudo telephoto field of view that will result by subsequent enlargement at greater magnification during printing of the portion of the whole exposed frame which is identified according to the pseudo format setting. Encoding of the exposure frame with the selected pseudo format occurs by code means responsive to adjustment of the viewfinder to a selected pseudo telephoto field.

It is desirable, to provide a viewfinder for a tele/pan camera using fixed focus lenses to provide a more accurate representation of the pseudo field of views suitable for use with a camera having a fixed objective lens.

SUMMARY OF THE INVENTION

The present invention provides a simple viewfinder for a tele/pan camera using fixed focal length lenses and eyepieces to vary the magnification and field of view of the viewing image seen through the viewfinder in correspondence with selected pseudo telephoto or pseudo panoramic settings.

In a pseudo tele/pan camera viewfinder, a pan-associated objective is fixed to serve as a reference objective. Decrease-magnification means and increase-magnification means are selectively movable into coaxial relation with the pan-associated objective to respectively decrease and increase image magnification for normal and tele viewing of the subject. Releasable detents are provided for each magnification means to secure it in coaxial relation with the pan-associated objective.

A preferred embodiment of viewfinder, discussed in greater detail below, has a U-shaped sliding member mounted on a camera body for adding a selected fixed focal length lens element in front of a reference fixed focal length lens, and for simultaneously shifting into viewing position a different eyepiece lens of suitable fixed focal length and associated reflective reticle.

The invention provides a viewfinder for a tele/pan camera in which the magnification and bright frame for the "normal," "pan" and "tele" settings present an accurate representation of the resulting prints viewed from a constant distance. The viewfinder of the invention can be incorporated into a camera with minimum invasion of the camera body and without any complicated mechanism.

BRIEF DESCRIPTION OF THE DRAWINGS

An embodiment of the invention has been chosen for purposes of description and illustration, and is shown in the accompanying drawings, wherein.

Throughout the drawings, like elements are referred to by like numerals.

DETAILED DESCRIPTION OF THE PREFERRED EMBODIMENT

Figure 1:
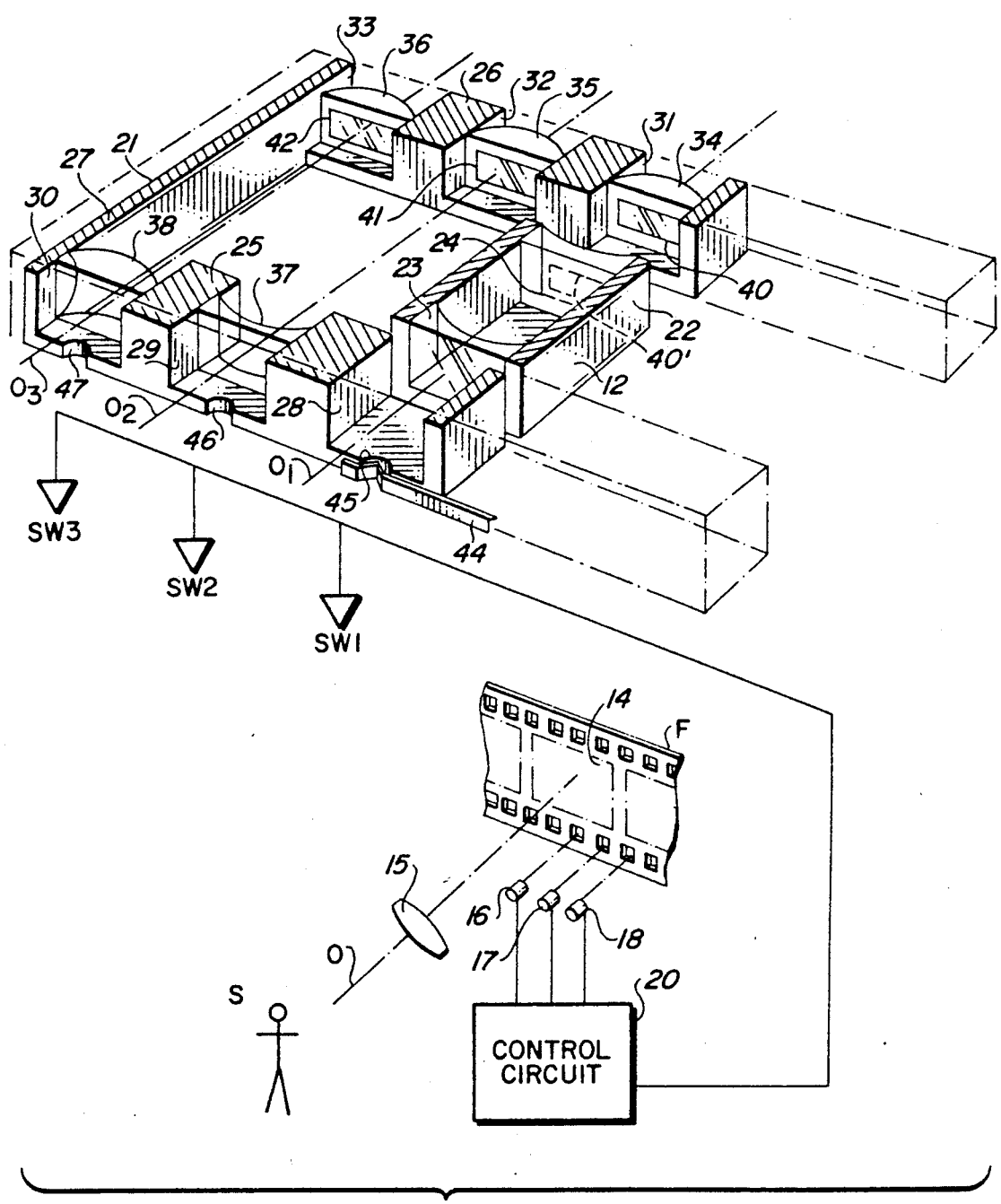
FIG. 1 is a view, partially in schematic, of a viewfinder in accordance with an embodiment of the invention.

The principles of the invention are described with reference to an exemplary implementation of a viewfinder assembly 10 used in a tele/pan camera of the type described in the above referenced patents to the same inventor. A film F is loaded in a lightproof cavity within the camera body 12 and has an exposure frame 14 located in alignment with an optical axis 0 of a fixed focal length objective lens 15 at a focal plane to be exposed to light passing from a subject S to be photographed through the lens 15 when an exposure gate is actuated, such as in response to depression of a shutter release mechanism. The camera 12 has a plurality of light emitting diodes (LED's) 16, 17, 18 located in accordance with known tele/pan principles for selective energization to spot-expose various frame specific code fiducials in binary form onto the film F adjacent to the frame 14 in coordination with the frame exposure. For the arrangement shown, code fiducials 001, 010 and 001 are encoded onto film F according to closures of switches SW1, SW2, SW3 corresponding to selection of camera "pan," "normal" and "tele" settings. The LED's 16, 17, 18 are coordinated with switches SW1, SW2 and SW3 by means of control circuit 20.

In accordance with the invention, the viewfinder 10 comprises a U-shaped saddle or bracket 21 slidably mounted on the camera body 12 for movement relative to a tubular viewfinder reference lens housing 22 fixed on the camera body 12. The housing 22 includes an optically aligned fixed focal length, panoramic (wide-angle) objective lens 23 axially-spaced in optical alignment along an optical axis $O_1$ forwardly of a fixed spherical mirror 24. The bracket 21 has two laterally-spaced, longitudinally extending arms 25, 26 connected by a lateral piece 27. The arm 25 includes three longitudinally-spaced apertures 28, 29, 30, and the arm 26 includes three like longitudinally-spaced apertures 31, 32, 33, respectively oppositely disposed from the apertures 28, 29, 30. The apertures 31, 32, 33 respectively mount three eyepiece lenses 34, 35, 36, having different fixed focal lengths and incorporating different reticles appropriate for defining the "pan," "normal" and "tele" field of views respectively. The apertures 29, 30 respectively mount first and second fixed focal length auxiliary lens 37, 38, and aperture 28 is lensless.

The apertures and therein mounted lenses are respectively configured so that eyepiece lens 34 is normally aligned with optical axis $O_1$ and with the lensless aperture 28; the lenses 35 and 37 are coaxially aligned along an optical axis $O_2$; and the lenses 36 and 38 are coaxially aligned along an optical axis $O_3$. The U-shaped bracket 21 operates relative to the fixed lens tube 22 so that it may be relatively laterally shifted as a unit, together with its associated lenses into a selected one of three positions: the "pan" positions with the lens 34 aligned on the optical axis $O_1$; a "normal" position with the axis $O_2$ made coincident with the axis $O_1$; and a "tele" position with the axes $O_3$ made coincident with the axis $O_1$.

The respective finder lens magnifications are chosen so that the panoramic lens 23 is used as a reference, magnification is increased for the "tele" position, and decreased for the "normal" position. Such change is accomplished in accordance with the shown embodiment by selectively applying the auxiliary lenses 37 or 38 ahead of the single, fixed pan objective lens 23.

In the shown embodiment, the fixed pan objective 23 and "pan" eyelens 34 are designed for a magnification "M" and the reticle 40 (reflected as 40' in the mirror 24) of the eyelens 34 is configured for giving a viewfinder field of view corresponding to the "pan" mode. The optical system aligned along axis $O_2$ is designed to provide "normal" setting viewing of 30 percent less magnification (i.e, 71 M) when shifted into alignment with the axis $O_1$. The lens 37 is a negative auxiliary lens which when positioned before the fixed lens 23 shortens the combined focal length by a predetermined amount, and the accompanying shorter focal length eyepiece lens 35 and appropriate reticle 41 result in a reduced magnification and a normal aspect reticle. The optical system aligned along axis $O_3$ serves, when shifted into alignment with the axis $O_1$, to modify the "pan" optical system by 30 percent greater modification (i.e., 1.31 M) for telephoto viewing. The auxiliary lens 38 is a positive lens and the eyepiece lens 36 is weaker than the corresponding lens 35. The associated reticle 42 is appropriate for telephoto viewing.

Detent means, comprising a spring-loaded finger 44 and a plurality of recesses 45, 46, 47 respectively located adjacent apertures 28, 29, 30, acts as a click-stop to give positive mechanical and audible feedback to the user of the attainment of a selected viewfinder optical axis alignment. If desired, suitable electrical contacts can be located at the recesses 45, 46, 47 for cooperation with a fixed contact located at the finger 44 to provide closure of the switches SW1, SW2, SW3 directly in accordance with viewer positioning of the viewfinder 10. Such an arrangement will set the coding of the film F in correspondence with manual positioning of the viewfinder 10 at one of the "pan," "normal" or "tele" settings, and has the advantage that the view of the subsequently enlarged print will automatically correspond, without more, to the view seen in the finder 10.

In operation, the viewfinder 10 is shiftable manually by the photographer between positions of respective alignment of the pan eyepiece 34, optical axis $O_2$ lenses, or optical axis $O_3$ lenses into coincidence with the optical axis $O_1$, to vary the magnification and field of view of the image seen through the finder 10.

Figure 2A:
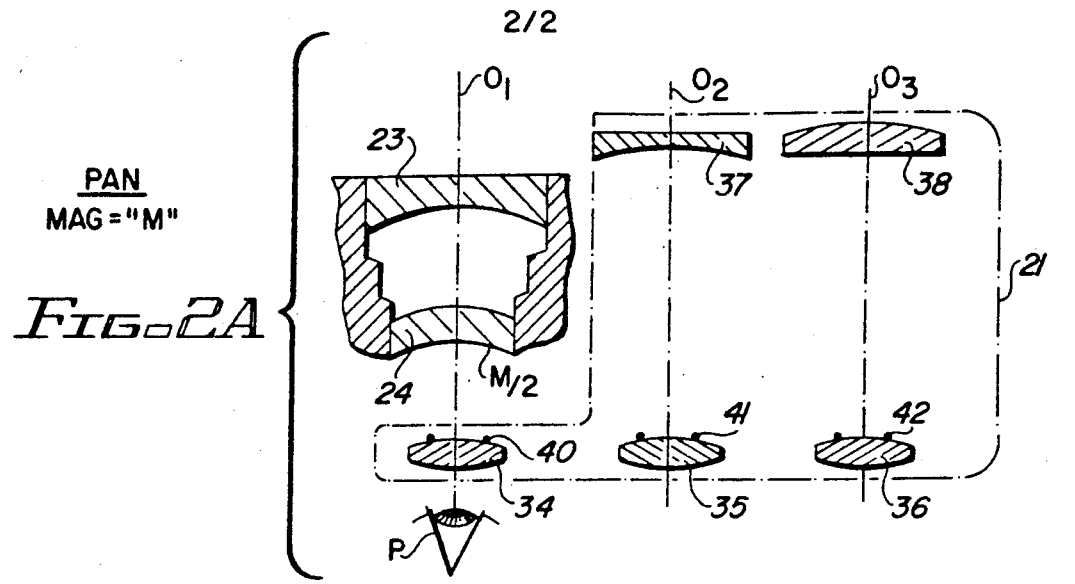
FIGS. 2A-2C schematic views helpful in understanding the operation of the viewfinder of FIG. 1.
Figure 2B:
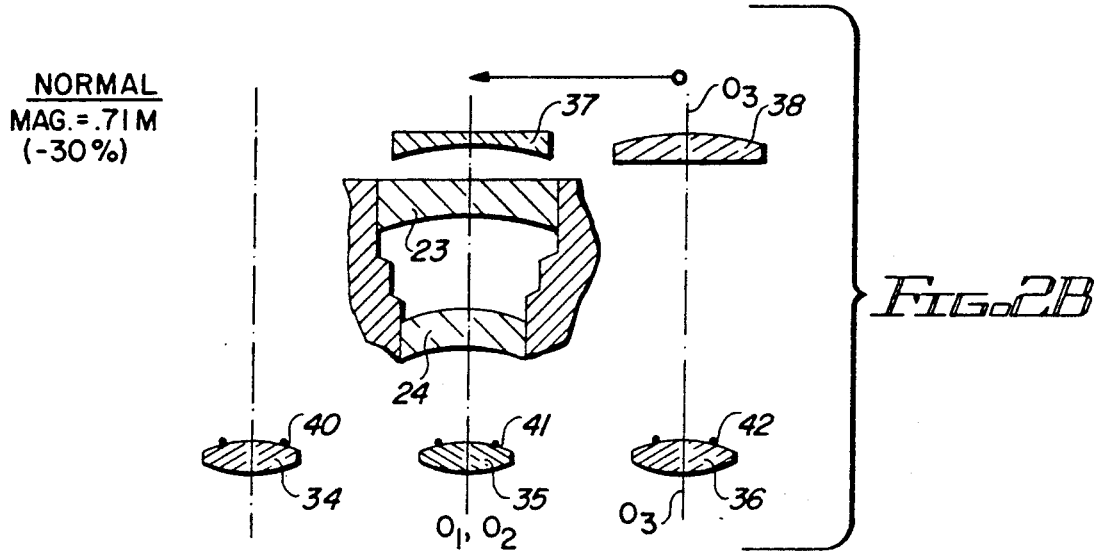
Figure 2C:
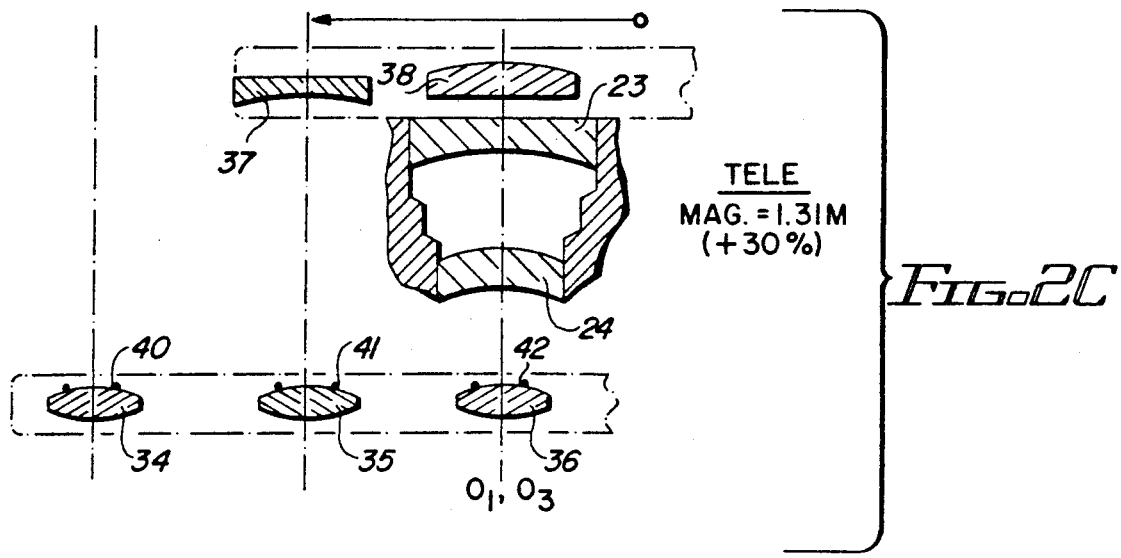

FIG. 2A shows the viewfinder in its "pan" position for making pseudo panoramic prints. The eyepiece lens 34 with reticle 40 is aligned with the optical axis $O_1$, for viewing of the subject S (FIG. 1) by a photographer (represented by the schematic eye designated by P). With the viewfinder in this positions, switch SW1 is closed for actuation of LED 16 to expose the code fiducial 001 in a marginal location on film F adjacent the frame 14. FIG. 2B shows the viewfinder in its "normal" position for making normal prints. The eyepiece lens 35 with reticle 41 has replaced the eyepiece lens 34, and the auxiliary lens 37 has been placed ahead of the lens 23, with the optical axes $O_1$ and $O_2$ in coincidence for reduced "normal" magnification. FIG. 2C shows the viewfinder in its "tele" position for making telephoto prints. The eyepiece lens 36 with reticle 42 has replaced the eyepiece lens 35, and the auxiliary lens 38 has replaced the lens 37 ahead of the lens 23, With the optical axes $O_1$ and $O_3$ in coincidence for increased "tele" magnification.

The picture taking lens 15 used for making the exposure remains fixed for all three settings; however, the resulting printed photograph will have a magnification and view as seen through the viewfinder. Pseudo format settings corresponding to the three finder settings will be selected and encoded onto the film F adjacent the exposed frame in accordance with the positioning of the finder bracket 21 which causes the closure of a corresponding one of the switches SW1-SW3 to respectively energize the LED's 16, 17, 18 under control of the circuit 20 at the time of exposure. It is appreciated that, though the shown finder assembly 10 is configured for shifting from "tele," "pan" and "normal" by manual means, a motor drive mechanism can be used to implement motor driven shifting. Moreover, although the lens 15 is shown as a fixed objective lens in accordance with a preferred embodiment of a simple viewfinder for a tele/pan camera, it will be appreciated that the same may be utilized with appropriate modification, if desired, in a camera employing a zoom lens as the primary, picture-taking lens.

Those skilled in the art to which the invention relates will appreciate that other substitutions and modifications can be made to the described embodiment without departing from the spirit and scope of the invention as described by the claims below.

What is claimed is:

1. A photographic camera for taking exposures for use in producing normal, pseudo telephoto and pseudo panoramic prints comprising:
   a camera body;
   a picture-taking objective lens;
   a view finder having lens fixed relative to said camera body;
   first, second and third eyepiece lenses; and first and second finder objective lenses; said first eyepiece lens being movable into alignment with said fixed lens to present a finder panoramic field of view wider than the possible field of view of said picture-taking lens; said second eyepiece and first finder objective lenses being movable into alignment with said fixed lens to present a finder normal field of view the same as the possible field of view of said picture-taking lens; and said third eyepiece and second finder objective lenses being movable into alignment with said fixed lens to present a finder telephoto field of view narrower than the possible field of view of said picture-taking lens; and
   means for encoding an exposure with code indicia representative of a selected one of said finder panoramic, normal and telephoto fields of view, whereby a portion of the exposure corresponding to the selected finder field of view can be identified to produce a corresponding pseudo panoramic, normal or pseudo telephoto print.

2. In a photographic camera having a picture-taking objective lens with an actual field of view for exposing a film frame which, if fully printed during subsequent processing, will provide a normal print having a field of view corresponding to said actual field of view; said camera further including means for selecting between a normal print setting and a pseudo format print setting; means, responsive to said selecting means, for coding said film when said pseudo format print setting is selected to identify a portion less than all of said frame which, when said portion is printed during said subsequent processing, will provide a pseudo field of view; and viewfinder means for viewing a subject to be photographed; the improvement comprising:
   said viewfinder means including a fixed reference lens and a movable first eyepiece lens coaxially-spaced from said reference lens and associated with said pseudo format print setting for providing a finder field of view corresponding to said pseudo format print field of view; movable means comprising a first objective lens and a second eyepiece lens coaxially-spaced from said first objective lens, associated with said normal print setting for decreasing image magnification of said reference lens when brought into optical alignment with said reference lens to alter said finder field of view to a field of view corresponding to said normal print field of view; and means for selectively simultaneously moving said first eyepiece lens and said decreasing magnification means to bring said decreasing magnification means into optical alignment with said reference lens in place of said first eyepiece lens.

3. An improvement as in claim 2, in a camera having selecting means comprising means for selecting among a normal print setting, a pseudo panoramic print setting and a pseudo telephoto print setting; and coding means comprising means for coding said film to provide a print having a panoramic field of view when said pseudo panoramic print setting is selected, and a print having a telephoto field of view when said pseudo telephoto print setting is selected; said improvement further comprising said fixed reference lens providing a finder field of view corresponding to said pseudo panoramic print field of view, and said viewfinder means further having means, comprising a second objective lens and a third eyepiece lens coaxially-spaced from said second objective lens, associated with said pseudo telephoto print setting for increasing image magnification of said reference lens when brought into optical alignment with said reference lens to alter said finder field of view to a field of view corresponding to said pseudo telephoto print field of view; and said means for selectively moving said decreasing magnification means further comprises means for selectively moving said increasing magnification means into optical alignment with said reference lens in place of said first eyepiece lens.

4. An improvement as in claim 3, wherein said decreasing magnification means comprises a first lens, said increasing magnification means comprises a second lens, and said means for selectively moving said decreasing magnification means or said increasing magnification means into optical alignment with said reference lens comprises a sliding member mounting said first, second and third eyepiece lenses and said first and second objective lenses for selectively slidingly positioning a selected one of said first eyepiece lens, decreasing magnification means and increasing magnification means in optical alignment with said reference lens.

5. An improvement as in claim 4, wherein each of said eyepiece lenses has a different reticle.

6. An improvement as in claim 4, further comprising releasable detent means for maintaining said selective optical alignments.

7. An improvement as in claim 4, wherein said sliding member is a U-shaped bracket.

8. An improvement as in claim 4, wherein said improvement further comprises said means for selecting and means for coding being associated with said sliding member so that said film is coded in accordance with the setting corresponding to the finder field of view established by selectively moving said sliding member.

9. In combination with a photographic camera for taking exposure for use in producing normal and pseudo format prints, said camera comprising:
   a picture-taking objective lens with an actual field of view for receiving light from a subject to be photographed and exposing a film frame which, if fully printed during subsequent processing, will provide a normal print having a view of the subject corresponding to said actual field of view;
   means for selecting among a normal print setting, a first pseudo format print setting, and a second pseudo format print setting; and
   means, responsive to said selecting means, for coding said film when one of said pseudo format print settings is selected to identify a portion less than all of said frame which, when said portion is printed during subsequent processing, will provide a pseudo format print having a view of a part of the subject identified with said selected one setting and corresponding to a pseudo format field of view different from said actual field of view;
   a viewfinder having a field of view and comprising:
   a fixed first finder objective lens;
   a bracket having two laterally-spaced, longitudinally extending arms;
   first, second and third eyepiece lenses mounted in longitudinally-spaced positions on one of said arms;
   second and third finder objective lenses mounted in longitudinally-spaced positions on the other of said arms in respective optical alignment with said second and third eyepiece lenses;
   means mounting said bracket for selective movement relative to said first finder objective lens, among first, second and third positions, respectively, of optical alignment of said first eyepiece lens with said first finder objective lens, of said second eyepiece lens and said second finder objective lens with said first finder objective lens, and of said third eyepiece lens and said third finder objective lens with said first finder objective lens;
   said lenses being relatively dimensioned, configured and adapted so that in said first position, said viewfinder field of view corresponds to said view of said print associated with said first pseudoformat print setting; in said second position, said viewfinder field of view corresponds to said view of said print associated with said normal print setting; and in said third position, said viewfinder field of view corresponds to said view of said print associated with said second pseudo format print setting.

* * * * *